Sept. 1, 1953 H. J. FORTUNE ET AL 2,650,831

RECORD CHANGING MECHANISM FOR PHONOGRAPHS

Filed Aug. 28, 1947 6 Sheets-Sheet 1

INVENTORS
Henry James Fortune
Edward Walter Mortimer
By David Mount
their attorney Sept. 1, 1953 H. J. FORTUNE ET AL 2,650,831

RECORD CHANGING MECHANISM FOR PHONOGRAPHS

Filed Aug. 28, 1947 6 Sheets-Sheet 2

INVENTORS
Henry James Fortune
Edmund Walter Mortimer
By [signature]
Their attorney

INVENTORS

Henry James Fortune

Edward Walter Mortimer

By [illegible]

their attorneys

Sept. 1, 1953 H. J. FORTUNE ET AL 2,650,831

RECORD CHANGING MECHANISM FOR PHONOGRAPHS

Filed Aug. 28, 1947 6 Sheets-Sheet 4

INVENTORS
Henry James Fortune
Edward Walter Mortimer
By [illegible]
their attorney Sept. 1, 1953 H. J. FORTUNE ET AL 2,650,831

RECORD CHANGING MECHANISM FOR PHONOGRAPHS

Filed Aug. 28, 1947 6 Sheets-Sheet 5

INVENTORS
Henry James Fortune
Edmund Walter Mortimer
By David J. Mount
their attorney Sept. 1, 1953 H. J. FORTUNE ET AL 2,650,831

RECORD CHANGING MECHANISM FOR PHONOGRAPHS

Filed Aug. 28, 1947 6 Sheets-Sheet 6

INVENTORS
Henry James Fortune
Edmund Walter [illegible]
By [illegible]
their attorney Patented Sept. 1, 1953 2,650,831

UNITED STATES PATENT OFFICE 2,650,831

RECORD CHANGING MECHANISM FOR PHONOGRAPHS

Henry James Fortune and Edmund Walter Mortimer, Swindon, England, assignors to The Gerrard Engineering & Manufacturing Company Limited, Swindon, England Application August 28, 1947, Serial No. 771,000
In Great Britain June 27, 1947

2 Claims. (Cl. 274—10)

This invention relates to record changing mechanism for phonographs of the kind in which the stack of records is supported at the centre by a spindle having an offset portion providing a supporting shoulder and at the circumference by a platform having means for displacing the lowest record so that it is fed on to the turntable. The invention further relates to record changing mechanism as specified above wherein a rotary control cam device is provided for controlling the raising of the pick-up, swinging it clear of the record, releasing a new record, returning the pick-up to the playing position and lowering it on to the new record, such device having an interrupted gear wheel, the gap of which faces a driving pinion during the playing of a record and which device is given an initial movement to mesh the gears when the pick-up enters the run-out groove of the record.

Modern records are provided with a run-out groove which is concentric with the centre of the record and at a standard radius therefrom. Earlier records on the other hand are provided with a run-out groove which is eccentric to the centre of the record.

One object of the present invention is to provide improved means whereby the rotary control device will be commenced irrespective of the type of run-out groove on the record being played.

Another object is to provide manually operable means whereby a record may be rejected, i. e. the control device may be brought into action at any time during the playing of such record.

A further object is to provide manually operable starting means for causing the control device to function for the playing of single records which are placed direct upon the turntable.

The invention consists in record changing mechanism of the type set forth wherein a pivoted impulse lever is provided for initiating the cycle of rotation of the control device by contacting with a projection or pin on said device, the lever being held in a cocked position by a trip lever adapted to be moved to a release position by a pick-up lever which moves in accordance with the movements of the pick-up arm, the trip lever having a toothed or ratchet surface adapted to be engaged by a stop pawl or a roller carried by the pick-up lever.

The arrangement is such that when the record being played is provided with an eccentric run-out groove, the pawl engages the toothed or ratchet surface and pivots the trip lever, while when the record is provided with a concentric groove pivoting of the trip lever is effected by engagement of the roller with the toothed surface.

The pawl may comprise a pivotally mounted lightly sprung member.

The roller may be adjustable to conform to the radius of the run-out groove.

The resetting of the impulse lever may be effected by the engagement of the projection or pin on the control device with a cam surface on the impulse lever.

The trip lever may be provided with a projection or tooth adapted for engagement by a pivoted reject lever actuated by a manually operable lever whereby the trip lever may be pivoted to release position for "rejecting" a record.

The rotary control device may be provided with a pair of cam elements adapted to actuate a swing-lever for swinging the pick-up arm, one cam controlling the normal movements when there is still one or more records in the stack, while the other causes the arm to swing to a rest position and the opening of a motor switch when the last record has been delivered from the stack, means being provided for locking the swing-lever in its outermost or rest position.

According to a further feature of the invention a friction lever manually operable by a starting lever may be provided for releasing the swing-lever-lock and at the same time release the trip lever and switch on the motor.

Figures 3, 3A:
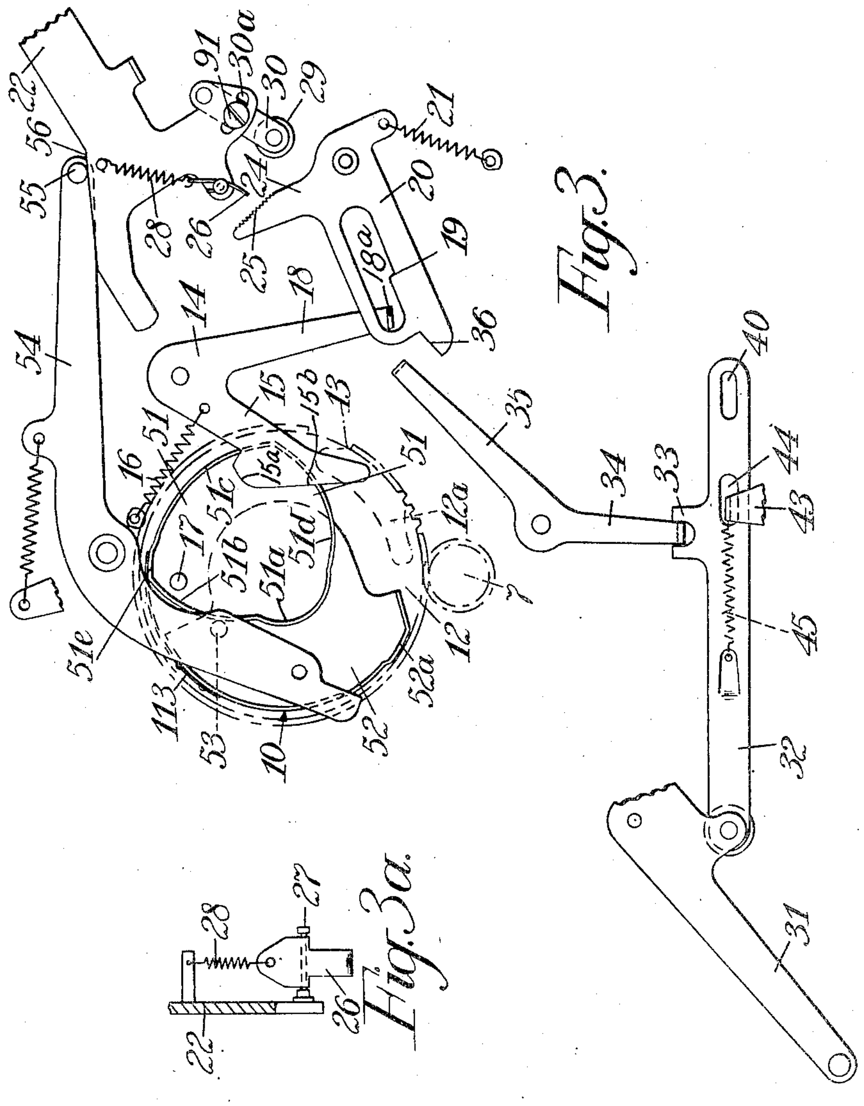
Figure 3 is a plan of the rotary control device, reject mechanism, impulse lever means and the alternative automatic trip release for the impulse lever.

Figure 3*a* is a detail view of a pivoted pawl device on the pick-up lever.

Figures 4, 5:
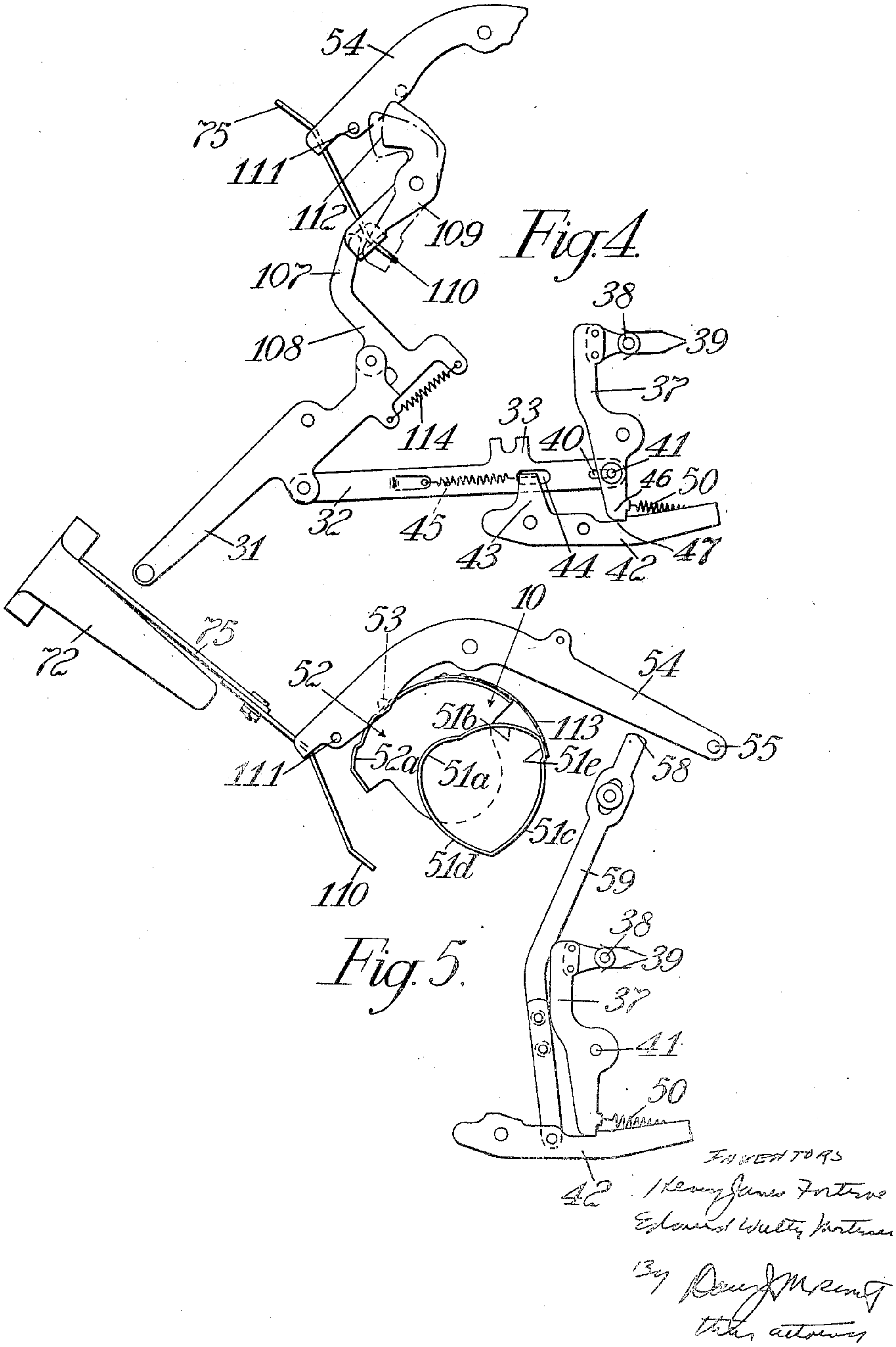

Figure 4 is a plan of the hand start and stop mechanism.

Figure 5 is a plan of the knock-off mechanism.

Figure 6:
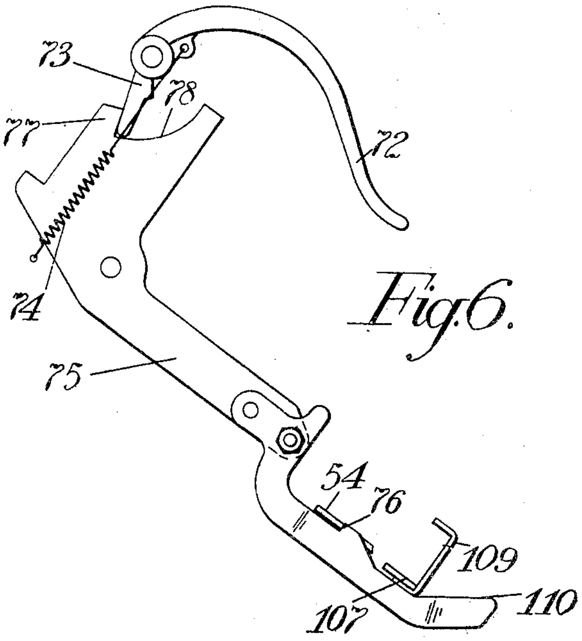

Figure 6 is a part elevation of the knock-off mechanism.

Figure 7:
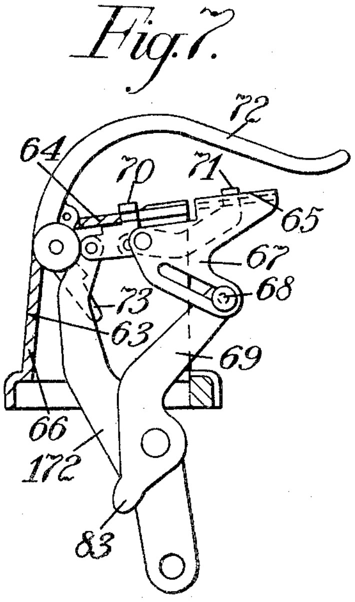

Figure 7 is an elevation of the platform and record feeding means in the position for 10" records.

Figure 8:
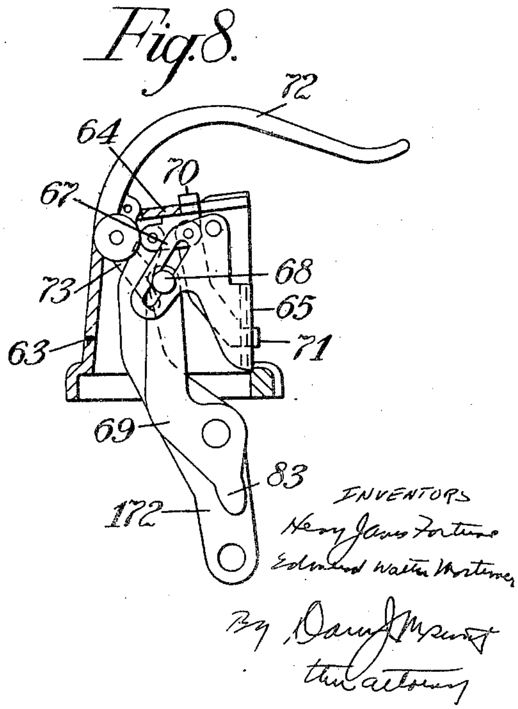

Figure 8 is an elevation of the platform and record feeding means in the position for 12" records.

Figures 9, 10, 11:
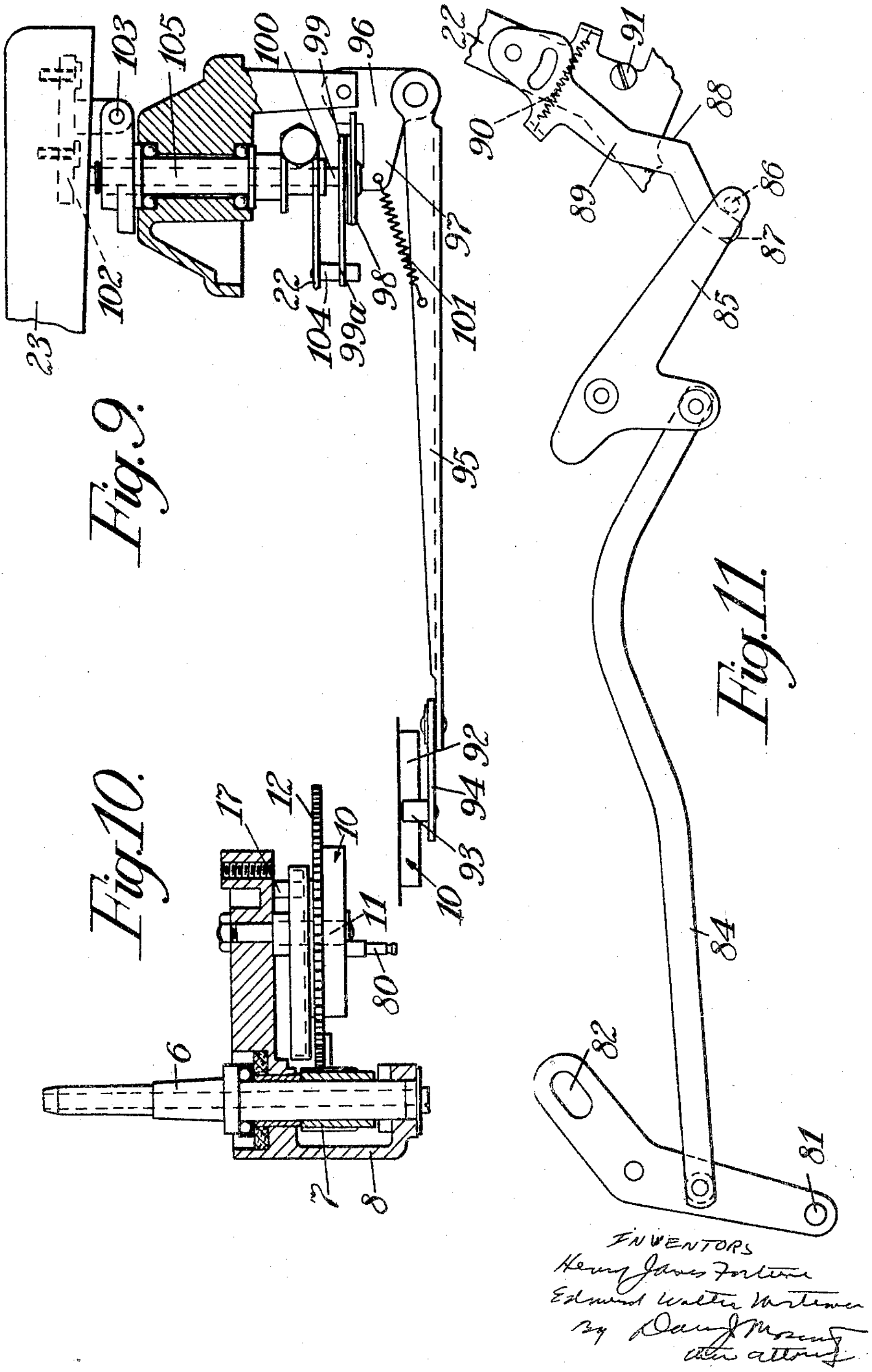

Figure 9 is an elevation of the pick-up arm lifting means.

Figure 10 is an elevation of the driving spindle and control device assembly.

Figure 11 is a plan of the selector mechanism.

In carrying the invention into effect, the turntable 1 is driven from a constant speed motor 2, through the motor pulley 3, intermediate wheel 4 and drum 5 which is secured to the turntable.

The turntable 1 is mounted upon the hollow spindle 6 to which a spur pinion 7 is secured. The spindle 6 rotates in a bearing member or bracket 8 which is secured to the motor board 9. The pinion 7 is adapted to drive a control cam device 10 which is rotatably mounted upon a stub shaft 11 depending from the bearing bracket 8. The drive from the pinion 7 is effected intermittently by a spur gear wheel 12 which is provided with an interruption or gap 13. During the playing of a record the interruption 13 is located opposite the pinion 7 so that no drive takes place.

The control device is provided with cam means which cause the lifting of the pick-up arm, swinging of the arm clear of the record, release of a new record, return of the pick-up arm to the starting position and lowering of the stylus on to the record.

The rotary cycle of the control device 10 normally commences at the end of the playing of a record under the control of the pick-up arm when the stylus moves into the run-out groove on the record. In order to mesh the pinion 7 with the gear 12 the control device 10 has an impulse imparted thereto by a pivoted impulse lever 14 (see Figure 3) the arm 15 of which under the action of the spring 16 strikes a pin 17 carried by the control device. The impulse lever 14 is provided with a second arm 18 the end of which engages a detent or shoulder 19 on a pivoted trip lever 20. The trip lever 20 is provided with a spring 21 for holding the detent 19 in engagement with the arm 18.

Movement of the trip lever 20 to the release position is effected by a pick-up lever 22 which moves in accordance with the movements of the pick-up arm 23.

In order to avoid jarring of the teeth when the drive commences the leading teeth of the spur wheel 12 are formed on a plate 12*a* which is pivotally mounted on the control element 10 and resiliently pressed to the meshing position. So that the mechanism may deal with records having a run-out groove concentric with the centre of the record and having a specified radius as well as records having an eccentric run-out groove, the pick-up lever 22 is provided with alternative tripping means for moving the trip lever 20. The trip lever 20 is provided with an arm 24 having a serrated or toothed surface 25, which when the trip lever is in the cocked position lies in the path of the tripping means.

The tripping means for eccentric run-out groove records comprises a pawl 26 pivotally mounted on the pin 27 on the pick-up lever and lightly sprung by a spring 28.

When the stylus moves into the eccentric groove the pawl 26 engages the toothed surface 25 and on the backward movement or oscillation of the pick-up lever, due to the eccentricity, the trip lever 20 will be moved to release the impulse lever 14 and thus strike the pin 17 and initiate the movement of the control device 10.

For concentric run-out groove records, the pick-up lever 20 is provided with a roller 29 mounted on a pivoted arm 30. The roller 29 is adapted to engage the arm 24 and thus pivot the trip lever 20 to its release position. The roller 29 may be adjusted to suit the radius of the run-out groove by the pin and slot clamping means 30*a* for the arm 30.

At any time during the playing of a record, the control device may be manually brought into operation. For this purpose a pivoted start and stop lever 31 is provided which also functions for "rejecting" a record, i. e. stopping the playing of a record.

This lever 31 is coupled to a link 32 having a bifurcated arm 33 into which the arm 34 of a pivoted reject lever engages. The other arm 35 of the reject lever is adapted to engage a projection or tooth 36 on the trip lever 20.

When it is desired to "reject" a record, the start and stop lever 31 is moved to the reject position and released. This causes the link to be drawn to the left as seen in the drawings, pivoting the reject lever 34, 35 clockwise and thus moving the trip lever 20 to its release position, thus commencing the cycle of the control device 10.

The link 32 is operatively connected to a pivotally mounted switch arm 37 which carries circuit closing element 38 (see Figure 4) adapted to make or break the motor circuit at the contacts 39. The link 32 is provided with a slot 40 engaging a pin 41 on the switch arm 37. When the circuit is made, the switch arm is retained in its position by a pivotally mounted trigger 42. The trigger is provided with an arm 43 the end of which is bent over to engage in the slot 44 in the link. A spring 45 is connected to the arm 43 and to the link 32 tending to return the trigger to the switch arm retaining position. A spring 50 is provided between the trigger 42 and the switch arm and operates when the trigger is released to pull the element 38 out of contact with the contacts 39.

When the start and stop lever 31 is turned counterclockwise the link 32 is pushed to the right causing the trigger to release the switch arm and open the circuit. When the lever 31 is turned clockwise to start, it pulls on the link 32 inserting the circuit closing element between the contacts 39 and moving the toe 46 of the switch arm into engagement with the detent or shoulder 47 of the trigger.

The slots 44 and 40 provide lost motion between the trigger arm 43 and the pin 41 respectively.

The control device 10 (see Figure 3) is provided on its upper surface with a pair of cams 51, 52 adapted to control the swinging movements of the pick-up arm 23.

The cam 51 controls the movements when there is still at least one record left in the stack, while the cam 52 controls the swing out of the arm when the last record has been delivered on to the turntable and played.

The cams are adapted to be engaged by a follower or pin 53 on a pivot swing lever 54. During the playing of the record the follower 53 is in engagement with the low concentric part 51*a* of the cam 51; the rising part 51*b* causes the swing-out of the pick-up arm; the high concentric part 51*c* maintains the pick-up arm in the outer position while another record is being delivered on to the turntable; the descending part 51*d* controls the swing-in of the pick-up arm.

The swing-out of the pick-up arm is caused by engagement of a pin 55 on the swing lever 54 with the surface 56 on the pick-up lever 22. When the last record has been played and the cam 51 swings out the pick-up arm, the swing-out lever 54 is prevented from returning by means hereinafter described, with the result that the follower 53 becomes engaged by the cam 52. At the commencement of the cam 52 there is a high part 52a which provides an extra swing to the lever 54 so that the follower 55 moves along the surface 56 of the pick-up lever 22. This extra swing brings the swing lever 54 into engagement with the end 58 of a link 59 (see Figure 5) which is coupled to the trigger 42 whereby the switch lever 37 is released and the motor cut out. Continued movement of the control device 10 brings the concentric part of the cam 52 into engagement with the follower 53.

The stack of records is supported by a fixed spindle 60 having an offset part 61 and shoulder 62, and by a platform unit 63 (see Figures 7 and 8). The platform has a fixed part 64 for supporting 12" records and a displaceable part 65 for 10" records. The displaceable part 65 is pivotally mounted on the housing 66 of the platform unit and is provided with a slotted arm 67 in which a pin 68 carried by a pivoted lever 69 can slide. When the lever 69 is in the position of Figure 7 the pin 68 supports the platform part 65 in its opertaive position. When the lever 69 is pivoted counterclockwise it pivots the platform part 65 downwardly so that the platform 64 is available.

Each platform 64, 65 is provided with a record feeding finger 70, 71 respectively. These fingers are linked together and to a pivoted operating lever 172.

Pivotally mounted on the housing 66 is a record clip or steadying arm 72 which is provided with a short arm 73. A spring 74 is provided for holding down the clip on to the stack of records.

The arm 73 is adapted to co-operate with a pivoted knock-out lever 75 (see Figures 5 and 6) which has a detent or shoulder 76 adapted to engage the swing lever 54 when the last record from the stack has been delivered. The cam 51 has a rise 51e which gives the extra swing to the swing-out lever 54 so that it will pass beyond the detent 76. When there is still a record in position on the platform and the clip 72 is resting thereon the detent 76 lies below the plane of the swing lever 54. When, however, the last record has been delivered, the clip 72 is lowered so that the arm 73 engages the heel 77 of the knock-out lever 75 and raises the detent end into the path of the swing lever 54 so that said lever will be engaged thereby until the cam 52 engages the follower 53.

The knock-out lever 75 has a surface 78 which is engaged by the arm 73 when the clip 72 is raised to insert a fresh stack of records. Engagement of this surface 78 ensures the lowering of the detent end of the knock-out lever to release the detent 76 from the swing lever when the new stack is in position.

Figure 1:
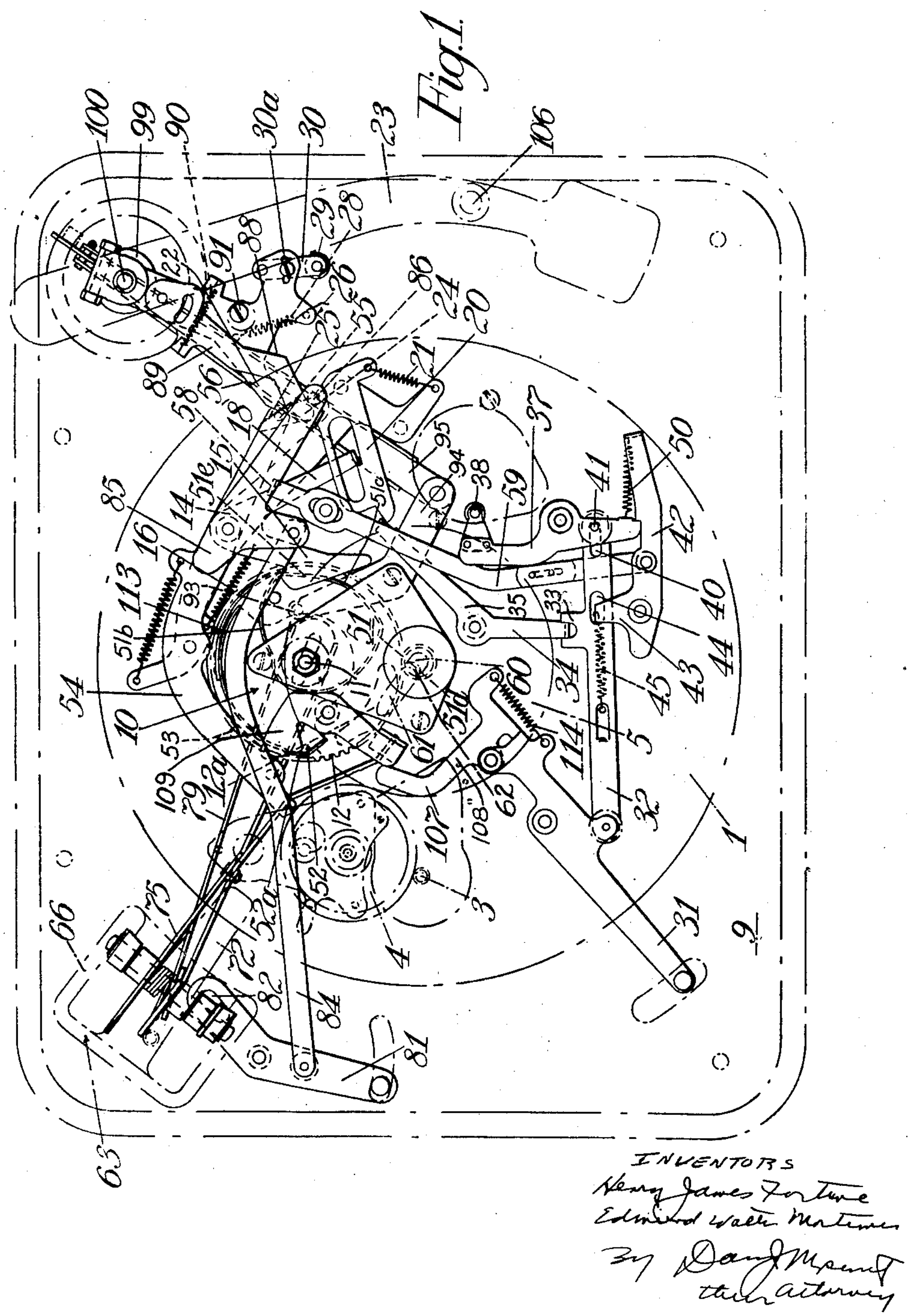
Figure 1 is a plan of the record changing mechanism and the associated parts.
Figure 2:
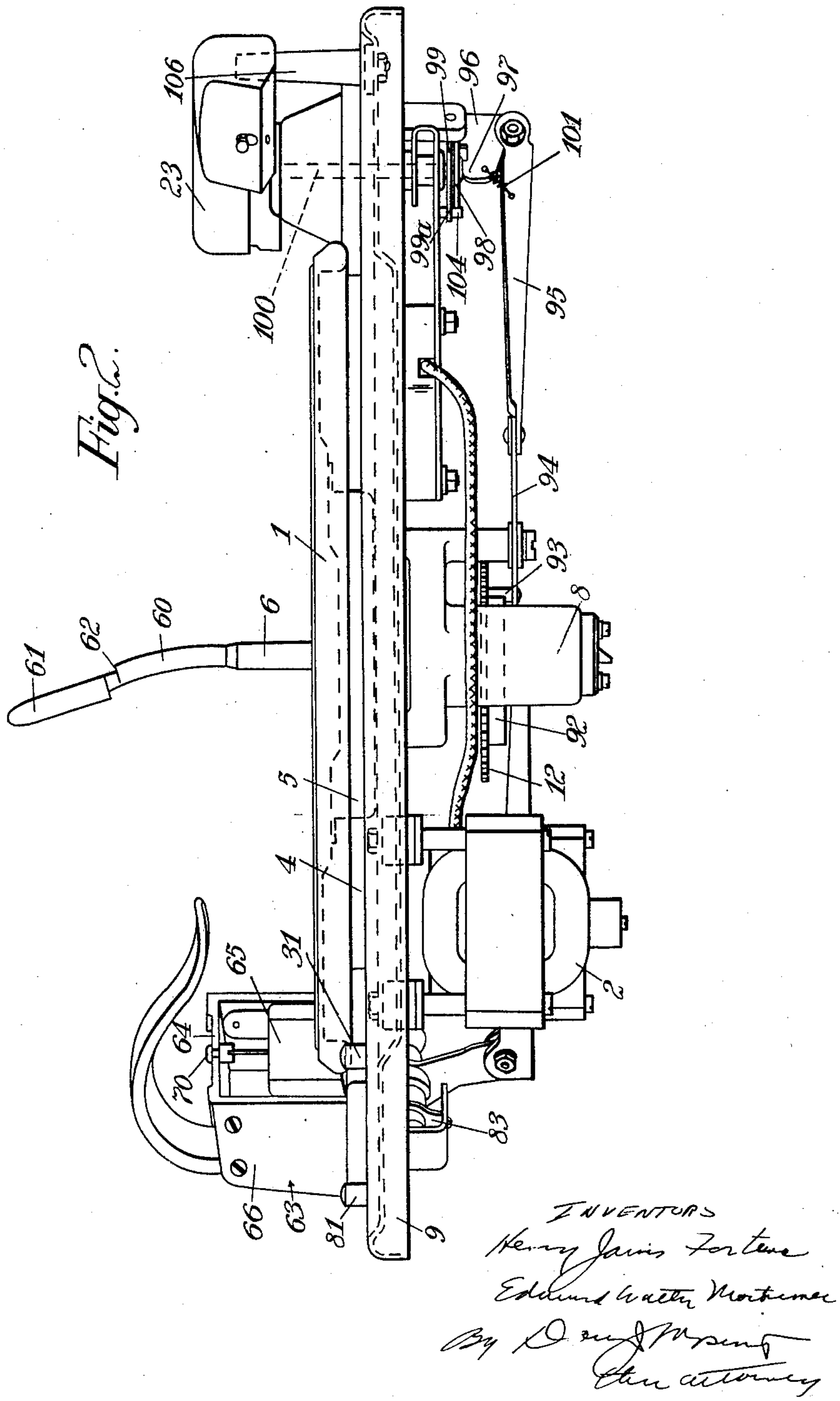
Figure 2 is an elevation.

The feeding fingers 70, 71 are actuated by a link 79 (see Figure 1) connected to the lever 172 to a crank pin 80 (Figure 10) on the control device 10. The connection to the crank pin 80 is by a slot affording a lost-motion so that the fingers are only actuated during a part of the crank pin stroke.

The displacing movements of the 10" platform 65 are effected by a manually operated change over lever 81 (see Figure 11) which has a slot 82 engaging the arm 83 of the lever 69. The change over lever 81 is connected by a link 84 to a pivoted selector lever 85 a pin 86 on which is adapted to engage one or other of a pair of surfaces 87, 88 on a pick-up selector arm 89 which is pivotally mounted on the pick-up lever 22. A spring 90 between the pick-up selector arm 89 and the pick-up lever causes the pick-up arm to be moved to the appropriate playing position which is reached when the eccentric adjustable stop 91 on pick-up lever 22 engages the pick-up selector arm 89. The pick-up arm is retained in this position by friction means referred to hereinafter.

On its lower surface the control device is provided with a cam 92 (see Figure 9) which causes the raising and lowering of the pick-up arm and stylus from the record. This cam is engaged by a follower 93 on a lever 94 which is connected to a link 95 which in turn is coupled by an eccentric adjusting device to a lifting lever 96 the arm 97 of which seats beneath a lifting disc 98. The lifting disc 98 is located beneath a lifting plate 99 secured to the lower end of a lifting spindle 100, the upper end of which engages a surface on the pick-up arm bracket 102 which is pivoted at 103. A friction washer is provided between the lifting disc 98 and plate 99 for holding the pick-up arm in its selected position but such washer is spaced from the plate 99 when the pick-up arm and stylus is lowered on to the record. A spring 101 between the link 95 and arm 97 ensures this separation. Rotation of the plate 99 in relation to the pick-up assembly is prevented by the forked end 99a engaging a pin 104 on the pick-up lever 22 which is secured to the hollow spindle 105 upon which the pick-up arm 23 is mounted.

When the stack of records is exhausted and the last record has been played the knock-out lever 75 comes into operation through the lowering of the record clip so that the swing-out lever 54 is actuated by the cam 52 to maintain the pick-up arm 23 in the "out" position. Under these conditions the pick-up arm is lowered on the rest 106 and the motor cut out.

After the current is switched off the control element will rotate to the playing position, i. e. with the gap 13 opposite the pinion 7 under the momentum of the turntable. The turntable will come to rest of its own accord.

When it is desired to commence playing, a new stack having been mounted in position, the clip 72, now resting on the top record so that the detent 76 on the knock-off lever releases the swing-out lever 54. It is now only necessary to move the start and stop lever 31 to the start position causing the motor to start and moving the trip lever 20 to release the impulse lever 14.

Should it be desired to replay a record that is still on the turntable after the knock-out lever 75 has functioned, the start and stop lever 31 is moved to the start position; this moves the arm 107 of a lever 108 (see Figure 4) carried by the lever 31 into engagement with a pivoted lever 109 and moves the latter along an inclined surface 110 on the knock-out lever 75 pivoting the latter and so releasing the detent 76 from the swing-out lever 54. The follower 28 of the swing-out lever 54 is now under control of the cam 52. Similar action takes place when there are no records on the platform and it is desired to play single records which are placed directly upon the turntable.

The lever 109 is friction controlled and thus it remains in position to hold the knock-out lever 75 in release position until the control device has swung the swing-out lever 54 over the detent 76. The friction lever 109 is then returned to move it from the surface 110 by a pin 111 on the swing-out lever 54 engaging the surface 112 of the friction lever.

The lever 108 is capable of movement relative to the start and stop lever 31 under the control of the spring 114, such spring being only necessary to prevent undue strain on the mechanism should the lever 31 be held in the start position during the time that the resetting pin 111 is passing over the face 112 of the friction lever 109.

There is a gap between the cams 51 and 52 which is bridged by a leaf spring 113 (see Figure 3) secured to the cam 52 when the follower 53 is under the influence of the cam 52, i. e. during normal playing the spring 113 will lift to allow the follower to pass from the portion 51b to the portion 51c of the cam 51.

In operation assuming that the knock-out means have operated the pick-up arm 23 is located on the rest 106 and the follower 53 is on the cam 52, and a fresh stack of records having been placed on the platform 65 and spindle 66 (assuming the records to be 10″), the clip 72 will contact with the top record and consequently the knock-out detent 76 will be moved down to release the swing-out arm 54 which, however, does not move owing to the position of the follower 53. The lever 31 is now moved to the start position. This action moves the circuit closer 38 into engagement with the contacts 39 energising the motor. At the same time the trip lever 34, 35 releases the trip 20 allowing the impulse lever 14 to function and start the rotation of the control device 10 and bringing the spur gear 12 into mesh with the pinion 7. The rotation of the control device causes the pick-up arm 23 to be raised through the cam 92; the feeding of the bottom record on to the turntable; by the crank pin 90, link 78 and lever 172; the swinging in of the pick-up arm 23 under control of the swing-out lever 54 and cam 51; and the lowering of the arm and stylus on to the record, the control element coming to rest with the follower 53 in engagement with the cam surface 51a.

At the end of playing of the record, the pick-up lever 22 through the pawl 26 or roller 29, according to the type of run-out groove, actuates the trip 20 to release the impulse lever 14, the nose 15a of which under the influence of spring 16, engages the pin 17 and imparts the initial movement to the control element 10 and start the cycle of such element. While there is still at least one record on the platform, the swing-out lever 54 remains under control of the cam 51.

Near the end of the cycle of movement of the control element 10 the pin 17 engages the cam surface 15b of arm 15 of the impulse lever, pivoting such lever to bring the end 18a of arm 18 into position for engagement by detent 19 on trip lever 20, thus resetting the impulse lever.

After the last record has been delivered the knock-out lever 75 is raised by the lowering of the record clip 72 bringing the detent 76 into position for engagement by the swing-out lever 54. When the last record has been played, the control element 10 again functions to raise the pick-up arm 23 by the cam 92; swing out the pick-up arm by the cam 51 and swing-out lever 54 which by the cam portion 51e causes the lever 54 to become engaged by the detent 76 and held so that the follower 53 will ride on to cam 52, the portion 52a of which causes the swing-out lever 54 by the link 59 to release the switch lever 37 and switch off the motor. The pick-up arm is lowered on to the rest 106.

It will be appreciated that after the knock-out means has functioned through there being no records on the platform and the motor is switched off, the phonograph may be used for playing single records which are placed directly on the turntable (or for replaying a record already in position on the turntable) through the start and stop lever 31 actuating the friction lever 109 to release the swing-out lever 54 from the detent 76. The friction lever 109 will be reset by the pin 111 on the swing-out lever 54 so that the knock-out lever 75 will again function at the end of the playing or replaying of such record.

The movement of the start and stop lever 31 at any time to the reject position will bring the control device 10 into operation and thus cut out the playing of the record on the turntable.

We claim:

1. In record changing mechanism of the type including a rotatable control device rotatable by the turntable drive mechanism and operatively disengaged from such mechanism during playing of a record, an impulse lever operatively associated with the device and operable to impart an initial rotation to the latter to drivingly connect the device to such mechanism, a pick-up arm, a pick-up lever connected to the pick-up arm for conjoint movement therewith, and means operable by the control device, when the latter rotates, to lift the pick-up arm, swing the latter to its off position, effect delivery of a new record to the turntable, and engage the pick-up arm with the groove of the new record, a latching and releasing arrangement for the impulse lever comprising, in combination, a trip lever having a first arm with a latch engageable with said impulse lever and a second arm directly engageable by said pick-up lever when the latter is swung inwardly as the pick-up arm moves into the record run-out groove, and a spring biasing said trip lever to a position engaging the latch with the impulse lever to maintain the latter in retracted position and with said second arm in the path of movement of the pick-up lever, whereby, when the pick-up lever is swung inwardly as the pick-up arm travels the run-out groove, the pick-up lever will engage said second arm of the trip lever to swing the trip lever against the biasing action of the spring to release the latch from the impulse lever, a movably mounted "reject" lever having a movable end, said trip lever first arm having a projection engageable by said movable end whereby said "reject" lever may be moved to engage said projection to swing said trip lever to release said impulse lever to initiate rotation of said control device, a spring biased pivoted operator for the turntable driving motor control switch, a movable "start" and "stop" lever, a link pivotally connected to said "start" and "stop" lever and having a lost motion connection to said operator, said link having a bifurcation, said reject lever being pivoted intermediate its ends and having its other end engaged in said bifurcation, a pivoted trigger having an end engaged in a lost motion connection with said link and a latch surface, and a spring biasing said tirgger to a position engaging said latch surface with said operator in the switch closing position.

2. In record changing mechanism of the type including a rotatable control device rotatable by the turntable drive mechanism and operatively disengaged from such mechanism during playing of a record, a spring biased impulse lever operatively associated with the device and displaceable under action of said spring to impart an initial rotation to the latter to drivingly connect the device to such mechanism, a pick-up arm, a pick-up lever connected to the pick-up arm for conjoint movement therewith, and means operable by the control device, when the latter rotates, to lift the pick-up arm, swing the latter to its off position, effect delivery of a new record to the turntable, and engage the pick-up arm with the groove of the new record, a latching and releasing arrangement for the impulse lever comprising, in combination, a trip lever having a first arm with a latch engageable with said impulse lever for restraining the latter in retracted position against displacement under the biasing action of its spring, and a second arm directly engageable and displaceable by said pick-up lever when the latter is swung inwardly as the pick-up arm moves into the record run-out groove, and a spring biasing said trip lever to a position engaging the latch with the impulse lever to maintain the latter in retracted position and with said second arm in the path of movement of the pick-up lever, whereby, when the pick-up lever is swung inwardly as the pick-up arm travels the run-out groove, the pick-up lever will engage and displace said second arm of the trip lever to swing the trip lever against the biasing action of its spring to release the latch from the impulse lever, a movably mounted "reject" lever having a movable end, said trip lever first arm having a projection engageable by said movable end whereby said "reject" lever may be moved to engage said projection to swing said trip lever to release said impulse lever to initiate rotation of said control device, a spring biased pivoted operator for the turntable driving motor control switch, a movable "start" and "stop" lever, a link pivotally connected to said "start" and "stop" lever and having a lost motion connection to said operator, said link having a bifurcation, said reject lever being pivoted intermediate its ends and having its other end engaged in said bifurcation, a pivoted trigger having an end engaged in a lost motion connection with said link and a latch surface, and a spring biasing said trigger to a position engaging said latch surface with said operator in the switch closing position.

HENRY JAMES FORTUNE.
EDMUND WALTER MORTIMER.

References Cited in the file of this patent

UNITED STATES PATENTS

| Number | Name | Date |
|---|---|---|
| 1,938,810 | Collison et al. | Dec. 12, 1933 |
| 2,295,092 | Offen | Sept. 8, 1942 |
| 2,323,472 | Johnson et al. | July 6, 1943 |
| 2,378,086 | Johnson | June 12, 1945 |
| 2,412,441 | Carson et al. | Dec. 10, 1946 |
| 2,435,264 | Ansar | Feb. 3, 1948 |
| 2,490,678 | Dale | Dec. 6, 1949 |

FOREIGN PATENTS

| Number | Country | Date |
|---|---|---|
| 459,155 | Great Britain | Jan. 4, 1937 |